United States Patent [19]

Carlson

[11] Patent Number: 4,971,457
[45] Date of Patent: Nov. 20, 1990

[54] FLUID DAMPER

[75] Inventor: Russell L. Carlson, North Palm Beach, Fla.

[73] Assignee: United Technologies Corporation, Hartford, Conn.

[21] Appl. No.: 417,109

[22] Filed: Oct. 4, 1989

[51] Int. Cl.[5] .............................................. F16C 27/00
[52] U.S. Cl. ...................................... 384/99; 384/581
[58] Field of Search ................. 384/99, 215, 535, 536, 384/581, 582

[56] References Cited

U.S. PATENT DOCUMENTS

| | | | |
|---|---|---|---|
| 2,614,896 | 10/1952 | Pierce, Jr. ............................. | 384/99 |
| 2,631,901 | 3/1953 | Holben et al. ......................... | 384/99 |
| 3,214,225 | 10/1965 | Warnery ............................. | 384/535 X |
| 3,219,399 | 11/1965 | Smith .................................. | 384/581 |
| 4,213,661 | 7/1980 | Marmol ................................ | 384/99 |
| 4,457,667 | 7/1984 | Seibert et al. ...................... | 384/99 X |
| 4,872,767 | 10/1989 | Knapp ................................. | 384/99 |

Primary Examiner—Thomas R. Hannon

[57] ABSTRACT

A fluid damper for attenuating high amplitudes occasioned by shaft unbalance of a main engine shaft of an aircraft turbine type power plant comprising a full ring with circumferentially spaced fluid cavities surrounding the radial bearing and characterized as being simpler and less costly than heretofore used curve beam fluid dampers.

4 Claims, 2 Drawing Sheets

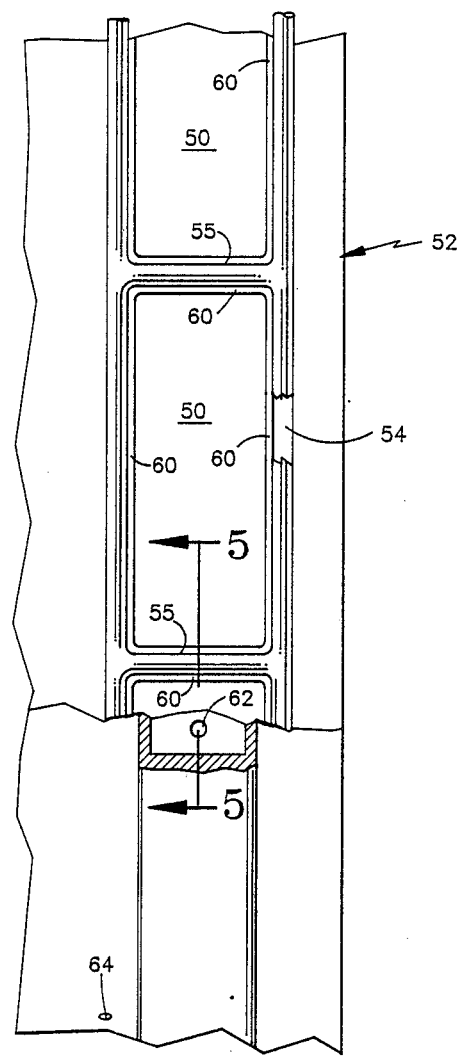
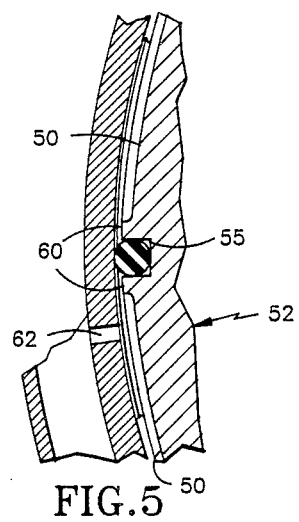

FLUID DAMPAR

The invention was made under a U.S. Government contract and the Government has rights herein.

CROSS REFERENCE TO RELATED APPLICATION

This application relates to U.S. Patent Application Ser. No. 417,108, filed on even date herewith, by Russell L. Carlson entitled Fluid Damper and Spring.

TECHNICAL FIELD

This invention relates to fluid dampers for a bearing supporting a shaft for damping cyclical transverse orbital movement of a nonrotating cylindrical body occasioned by the rotating shaft which supports the compressor and turbine rotors of a gas turbine engine and particularly to the construction of the fluid damper.

BACKGROUND ART

U.S. Pat. No. 4,213,661 entitled "Bearing Support Structure Combining Fluid Damping and Spring Damping Apparatus" granted to R. A. Marmol on July 22, 1980 and assigned to the same assignee as this patent application, typifies a fluid damper that is constructed with a plurality of arcuate beams that are mounted end-to-end to surround the bearing. As disclosed in that patent, the bearing is free to move orbitally about its annular cavity. This motion is transmitted to the fluid in the damper which in turn generates a hydrodynamic pressure which resists further displacement and effectively dampens the vibratory motions. Curved beam dampers, while efficacious for damping high loads are costly to manufacture, install and maintain. Obviously, because the individual segments must be manufactured with close tolerances and care must be used in assembling the parts, they are considered complex and impose a potential wear problem on multiple parts.

I have found that I can construct the damper with a full ring having oil filled cavities spaced around the circumference that simplifies the overall design and obviates the problems eluded to in the above, without a reduction of damping characteristics of segmented beam designs.

DISCLOSURE OF THE INVENTION

An object of this invention is to provide an improved fluid damper for aircraft gas turbine engines.

A feature of this invention is to incorporate a full ring having fluid cavities formed therein to provide the fluid damping.

A still further feature of this invention is to define the fluid cavities by providing a plurality of spaced oval or other shaped fluid filled cavities circumferentially mounted about the full ring.

A still further feature of this invention is to define fluid cavities by providing a plurality of cavities bounded by seals configured in a ladder-like shape around the circumference of the ring.

The foregoing and other features and advantages of the present invention will become more apparent from the following description and accompanying drawings.

BRIEF DESCRIPTION OF THE DRAWING

FIG. 4 is a partial view of the damper ring exemplifying another embodiment of the fluid damper.

FIG. 5 is a partial view taken along lines 5—5 of FIG. 4.

BEST MODE FOR CARRYING OUT THE INVENTION

Figure 1:
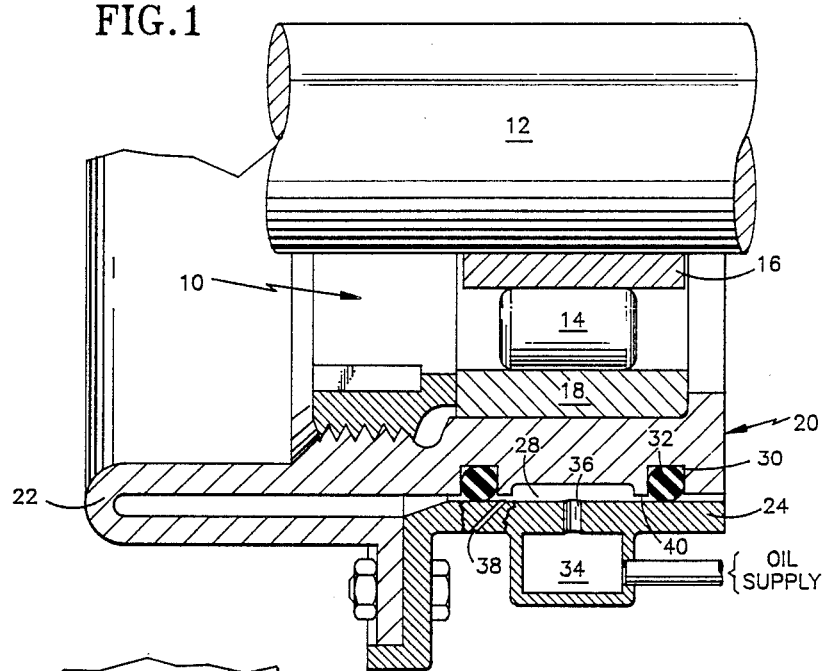
FIG. 1 is a partial view in section showing the invention in the preferred embodiment.
Figure 2:
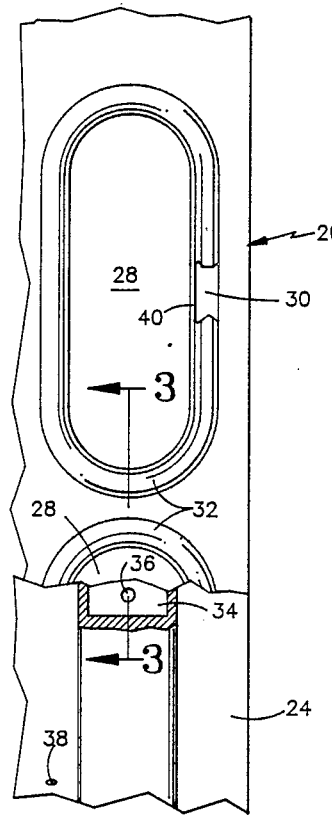
FIG. 2 is a partial view showing the circumferentially spaced damper cavities
Figure 3:
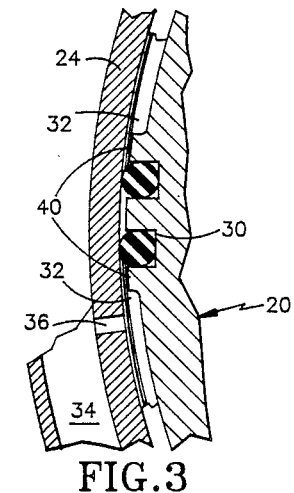
FIG. 3 is a partial view in section taken along lines 3—3 of FIG. 2.

Reference is made to FIGS. 1, 2 and 3 showing fluid dampers as typically employed with a radial bearing generally indicated by reference numeral 10 supporting the gas turbine engine's main shaft 12. As noted, the roller bearings 14 (one being shown) are supported between the inner race 16 rigidly supported to the rotating shaft 12 and the outer race 18.

Any vibratory motion created by or through shaft 12, say by virtue of a rotor unbalance, is transmitted through the inner race 16, roller bearings 14 and outer race 18 where it is reacted by the support and damper mechanism to be described hereinbelow.

In this embodiment, the support and damper mechanism includes fluid bearing support 20 having a circular shaped member resiliently supported by hairspring or squirrel cage 22 and is sandwiched between outer race 18 and support housing 24 typically grounded to the engine's case (not shown). Outer housing 24 that defines the compartment for supporting the bearing, likewise, is connected to one end of the hairspring 22 whose spring rate is sufficiently high so as not to interfere with the force created by the hydrodynamic pressure of the fluid damper, and only react the loads upon high unbalance conditions, say when a blade of the rotor fails.

As noted in FIGS. 1, 2 and 3, the outer diameter of stationary support 20 is recessed to define a cavity 28 for receiving damping fluid. Grooves 30 are formed around the periphery of the damper cavity to accept "O" seal or other appropriate seal 32. As is apparent from FIG. 2, damper cavity 28 is formed in an oval or race track shape and a plurality of similar damper cavities are spaced about the circumference of the support member 20. Fluid from a pressurized source is delivered to the manifold 34 that circumscribes the outer housing 24 and serves to supply fluid to each of the damper cavities through supply orifice 36. A suitable drain orifice 38 communicates with sump pressure and is provided for each of the fluid cavities 28. The inlet supply orifice is larger than the vent orifice to assure that sufficient pressure remains in the fluid cavity so as to develop sufficient hydrodynamic forces to dampen the normal amplitudes of the vibratory motion transmitted through shaft 12. As noted in FIG. 3, the cavity depth of the fluid cavity is deeper than the clearance of bumper 40 provided by the outer diameter surface of the annular support member. Clearance is maintained on both sides of grooves 30 to assure suitable containment of seal 32.

Another embodiment of this invention is exemplified in FIGS. 4 and 5 to which reference is made. As noted, the damper cavities 50 are spaced circumferentially around the support member 52 which would be the equivalent of support member 20 of FIG. 1. Grooves 54 and cross grooves 55 extend around each of the spaced fluid cavities and serve to hold suitable sealing material that preferably is molded into place, but the seal can be formed in the shape of a ladder and fabricated from a single piece. This serves the same function as "O" rings 32.

As noted in FIG. 5, the raised portion is formed on the outer surface of support 52 defines a bumper and forms the wall of the cavity 50. Similarly to the embodiment of FIGS. 2 and 3, each of the cavities contain a fluid supply orifice 62 and a drain orifice 64.

Although this invention has been shown and described with respect to detailed embodiments thereof, it will be understood by those skilled in the art that various changes in form and detail thereof may be made without departing from the spirit and scope of the claimed invention.

I claim:

1. For a shaft being supported by a radial bearing including an inner race, an outer race and roller bearings supported therebetween, fluid damper means including a one-piece nonrotating support member surrounding said outer race and mounted adjacent thereto, a fixed support housing having wall means defining, a compartment for supporting said bearing, said wall means defining an inner annular surface said nonrotating support member having an outer annular surface complementing said inner annular surface of said fixed housing, a plurality of circumferentially spaced cavities formed in said outer annular surface, means for supplying oil to each of said cavities and means for draining oil from said cavities, the rate of flow into and out of said cavities being selected to create a hydrodynamic force in each of said cavities for damping unbalance loads and sealing means formed around each of said cavities.

2. For a shaft being supported by a radial bearing as claimed in claim 1 wherein each of said cavities is oval shaped 3. For a shaft being supported by a radial bearing as claimed in claim 2 wherein each of said cavities are substantially rectangular shaped and circumferentially spaced around said outer annular surface and separated by a raised portion on said outer annular surface bounding said cavities, said sealing means formed from a single piece fitted into a groove formed in said raised portion.

4. For a shaft being supported by a radial bearing as claimed in claim 1 including a raised portion on said outer annular surface projecting toward said inner annular surface and having a groove bordering each of said cavities, and said sealing means supported in said groove.

* * * * *